United States Patent
Srivastava et al.

(10) Patent No.: US 12,271,527 B2
(45) Date of Patent: Apr. 8, 2025

(54) TACTILE SMART WATCH FOR VISUALLY IMPAIRED

(71) Applicant: INDIAN INSTITUTE OF TECHNOLOGY KANPUR, Kanpur (IN)

(72) Inventors: Vishwaraj Srivastava, Kanpur (IN); Siddhartha Panda, Kanpur (IN)

(73) Assignee: INDIAN INSTITUTE OF TECHNOLOGY KANPUR (IN)

( * ) Notice: Subject to any disclaimer, the term of this patent is extended or adjusted under 35 U.S.C. 154(b) by 0 days.

(21) Appl. No.: 18/552,202

(22) PCT Filed: Mar. 21, 2022

(86) PCT No.: PCT/IB2022/052529
§ 371 (c)(1),
(2) Date: Sep. 25, 2023

(87) PCT Pub. No.: WO2022/200978
PCT Pub. Date: Sep. 29, 2022

(65) Prior Publication Data
US 2024/0160292 A1    May 16, 2024

(30) Foreign Application Priority Data
Mar. 23, 2021  (IN) .............................. 202111012450

(51) Int. Cl.
*G06F 3/01*    (2006.01)
*G04G 21/08*   (2010.01)
(Continued)

(52) U.S. Cl.
CPC ............ *G06F 3/016* (2013.01); *G04G 21/08* (2013.01); *G06F 1/163* (2013.01); *G06F 3/041* (2013.01); *G08B 6/00* (2013.01)

(58) Field of Classification Search
CPC .......... G06F 3/016; G06F 3/041; G06F 1/163; G04G 21/08; G08B 6/00
See application file for complete search history.

(56) References Cited

U.S. PATENT DOCUMENTS

| | | | |
|---|---|---|---|
| 6,556,222 B1 * | 4/2003 | Narayanaswami | G04G 9/0064 368/69 |
| 10,252,058 B1 * | 4/2019 | Fuerst | A61N 1/36014 |

(Continued)

FOREIGN PATENT DOCUMENTS

| | | | |
|---|---|---|---|
| EP | 2927783 A1 * | 10/2015 | ............. G06F 1/163 |
| KR | 101725541 B1 * | 4/2017 | |

(Continued)

OTHER PUBLICATIONS https://enabled.in/wp/dot-watch-braille-smartwatch-reinventing-tactile-communication, May 10, 2017.*

*Primary Examiner* — Ricardo Osorio
(74) *Attorney, Agent, or Firm* — Jason C. Cameron

(57) ABSTRACT

A haptic tactile smart watch for the visually impaired is provided. The tactile smart watch comprises a watch case having a tactile digital interface. One or more tactile push buttons are configured on an outer circumference of the watch case. The one or more tactile push buttons activate one or more functions associated with the tactile smart watch. One or more touch sensitive indicators receive one or more touch inputs from a user input. Each of the one or more touch sensitive indicators generate one or more haptic feedback in response to the one or more touch inputs. A sensing module receives electrical signals corresponding to the identified specific actions from the one or more touch sensitive indicators, and senses one or more application parameters based on the received one or more electrical signals. The one or more application parameters are com- (Continued)

municated, via haptic feedback, numerically to the user using touch sensitive indicators.

4 Claims, 8 Drawing Sheets

(51) Int. Cl.
  *G06F 1/16* (2006.01)
  *G06F 3/041* (2006.01)
  *G08B 6/00* (2006.01)

(56) References Cited

U.S. PATENT DOCUMENTS

| | | | |
|---|---|---|---|
| 10,314,492 B2* | 6/2019 | Connor | A61B 5/681 |
| 11,435,830 B2* | 9/2022 | Moussette | G06F 3/0487 |
| 11,513,675 B2* | 11/2022 | Zambetti | G06F 3/04817 |
| 11,797,172 B2* | 10/2023 | Chan | G06F 3/0482 |
| 2007/0247976 A1* | 10/2007 | Capozzi | G06F 1/163 |
| | | | 368/82 |
| 2013/0215066 A1* | 8/2013 | Fertl | G04G 21/08 |
| | | | 345/173 |
| 2017/0322722 A1* | 11/2017 | Irvine | G06F 3/0414 |
| 2018/0052428 A1* | 2/2018 | Abramov | G04G 21/00 |
| 2020/0001895 A1* | 1/2020 | Scheggi | G06F 1/163 |
| 2022/0304622 A1* | 9/2022 | Freckleton | G16H 40/63 |

FOREIGN PATENT DOCUMENTS

| | | | | |
|---|---|---|---|---|
| KR | 20170129372 A * | 11/2017 | | |
| WO | WO-2016168097 A1 * | 10/2016 | | G04B 19/283 |
| WO | WO-2022109428 A1 * | 5/2022 | | A61B 5/002 |

* cited by examiner

TACTILE SMART WATCH FOR VISUALLY IMPAIRED

This Application claims priority from a Patent application filed in India having Patent Application No. 202111012450, filed on Mar. 23, 2021, and titled "A TACTILE SMART WATCH FOR VISUALLY IMPAIRED" and a PCT application bearing application no. PCT/IB2022/052529, filed on Mar. 21, 2022 and titled "A TACTILE SMART WATCH FOR VISUALLY IMPAIRED".

FIELD OF INVENTION

Embodiments of the present disclosure relate to a smart watch and more particularly to a tactile smart watch for visually impaired.

BACKGROUND

Smartwatches are compact multipurpose electronic devices wore on wrist. Smart watches are full-fledged digital watches that do a lot more than that of old traditional analog time tracking devices. They are becoming a popular tool for day-to-day health monitoring, as they are enabled to perform a variety of functions, such as—heart rate monitoring, sleep monitoring, etc. Further, smart watches can run apps and play back all sorts of digital media, like audio tracks or radio streamed to Bluetooth headphones. Further, many of the watches allow accessing functions like a calculator, thermometer, compass and more.

In one of existing arts, tactile watch is available for communicating time to blind users using vibrations and touch sensing. However, no tactile smartwatch is available, which is user-friendly for blind users and which functions silently. In existing arts, blind persons usually get to interact with smart watches using a audio only for health monitoring. The audio-based interaction is not very intuitive and adds to the cost of the device. Further, such smartwatches could not be used by blind people quietly and privately.

Hence, there is a need for a tactile smart watch for health monitoring of visually impaired in order to address the aforementioned issues.

SUMMARY

This summary is provided to introduce a selection of concepts, in a simple manner, which is further described in the detailed description of the invention. This summary is neither intended to identify key or essential inventive concepts of the subject matter nor to determine the scope of the invention.

In accordance with a first embodiment of the present disclosure, a tactile smart watch for visually impaired is disclosed. The tactile smart watch comprises a watch case comprising a tactile digital interface. One or more tactile push buttons are configured on an outer circumference of the watch case. The one or more tactile push buttons are configured to activate one or more functions associated with the tactile smart watch. One or more touch sensitive indicators are disposed on a bezel of the tactile digital interface. Each of the one or more touch sensitive indicators is configured to receive one or more touch inputs from a user and identify one or more specific actions required corresponding to the one or more touch inputs. Each of the one or more touch sensitive indicators are configured to generate one or more haptic feedback in response to the one or more touch inputs.

A sensing module configured within the watch case. The sensing module is configured to receive one or more electrical signals corresponding to the identified one or more specific actions from the one or more touch sensitive indicators, and to sense one or more application parameters based on the received one or more electrical signals. The one or more application parameters are communicated, via haptic feedback, numerically to the user using the one or more touch sensitive indicators.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.

DETAILED DESCRIPTION OF THE INVENTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention. It will be understood by those skilled in the art that the foregoing general description and the following detailed description are exemplary and explanatory of the invention and are not intended to be restrictive thereof.

The terms "comprise", "comprising", or any other variations thereof, are intended to cover a non-exclusive inclusion, such that one or more devices or submodules or elements or structures or components preceded by "comprises . . . a" does not, without more constraints, preclude the existence of other devices, sub-systems, additional submodules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting. Embodiments of the present invention will be described below in detail with reference to the accompanying figures.

The present disclosure provides a smart wearable device with a tactile digital interface for visually impaired. The present disclosure provides a smart watch that communicates one or more measurements of one or more health parameters using vibrations and touch sensing.

FIG. 1, FIG. 2, FIG. 3, FIG. 4 and FIG. 5 illustrate an exemplary tactile smart watch 100 for visually impaired, in accordance with an embodiment of the present disclosure.

Figure 1:
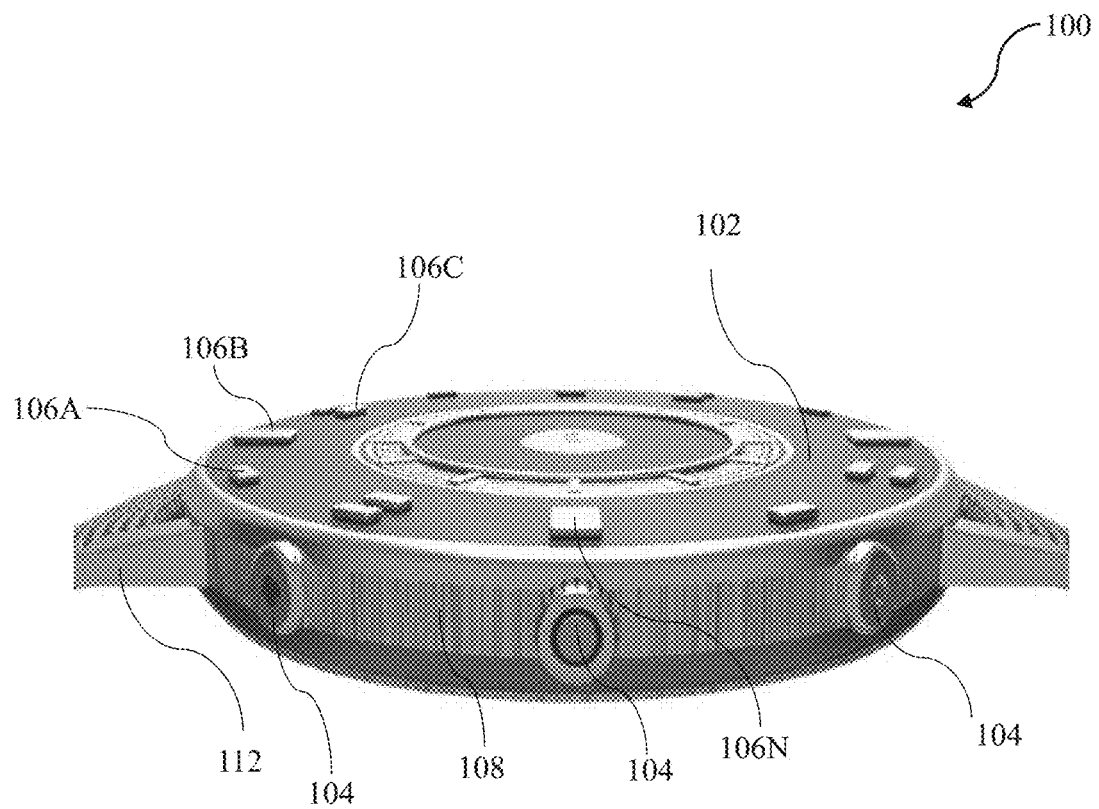
FIG. 1 illustrates an exemplary tactile smart watch for visually impaired, in accordance with an embodiment of the present disclosure.

FIG. 1 illustrates the tactile smart watch 100 including a watch case 108 and a sensing module disposed within the watch case 108. The watch case 108 includes a tactile digital interface 102. One or more tactile push buttons 104 are configured on an outer circumference of the watch case 108. The one or more tactile push buttons 104 are disposed on a bezel of the tactile digital interface 102 and configured to activate one or more functions associated with the tactile smart watch 100. In an exemplary embodiment, one of the one or more tactile push buttons 104 may be configured to power on/off the tactile smart watch 100. In another exemplary embodiment, one of the one or more tactile push buttons 104 may activate and deactivate a wireless connection 200 [shown in FIG. 7] of the tactile smart watch 100 with a computing device 300 [shown in FIG. 7]. The tactile smart watch 100 further includes one or more touch sensitive indicators 106 (106A-106N) disposed on a bezel of the tactile digital interface 102. Each of the one or more touch sensitive indicators 106 is configured to receive one or more touch inputs from a user and identify one or more specific actions required corresponding to the one or more touch inputs. The one or more specific actions may include activating one or more applications in the tactile smart watch. For example, the tactile smart watch may set an alarm by receiving a touch input for the same.

The one or more specific actions may include activating one or more applications in a communicatively coupled smart device. For example, the tactile smart watch wireless plays music through a music app on a computing device by receiving a touch input for the same. The one or more specific actions may include sensing the one or more application parameters via the sensing module. For example, the tactile smart watch may sense the heart rate of user by receiving a touch input for the same.

Further, in an exemplary embodiment, each of the one or more touch sensitive indicator 106 may receive one or more touch inputs from a user based on number of times each of the one or more touch sensitive indicators106, is touched by user. For example, a long touch on a touch sensitive hour indicator may perform an action of generating the haptic icon, while an action like a double tap may activate heart rate sensing.

Also, each of the one or more touch sensitive indicators 106 are configured to generate one or more haptic feedback in response to the one or more touch inputs. The one or more haptic feedback is received by the user by touching the tactile digital interface 102. Further, the tactile smart watch 100 includes a strap 112 which is tied on a hand of the user for health monitoring and other applications of the tactile smart watch 100.

The sensing module is configured within the watch case 108 to receive one or more electrical signals corresponding to the identified one or more specific actions from the one or more touch sensitive indicators 106. Thereafter, the sensing module senses one or more application parameters based on the received one or more electrical signals. The one or more application parameters comprise heart rate, oxygen saturation, blood pressure, environmental condition and amount of movement of user. The one or more application parameters are communicated, via haptic feedback, numerically to the user using the one or more touch sensitive indicators.

The one or more haptic feedback comprises vibration of the one or more touch sensitive indicators in a predefined sequence for a predefined duration. The vibration of each of the one or more touch sensitive indicators represents a predefined numerical digit. The predefined duration of the vibration represents place value of the predefined numerical digit.

In an exemplary embodiment of present disclosure, there are three predefined time of vibration, i.e.—a first predefined time of vibration, a second predefined time of vibration and a third predefined time of vibration. The first predefined time of vibration is of 600 ms, which represents a digit in hundreds place. The second predefined time of vibration 300 ms which represents a digit in tens place. Further, the shortest vibration of 150 ms represents a digit in one's place.

Figure 2:
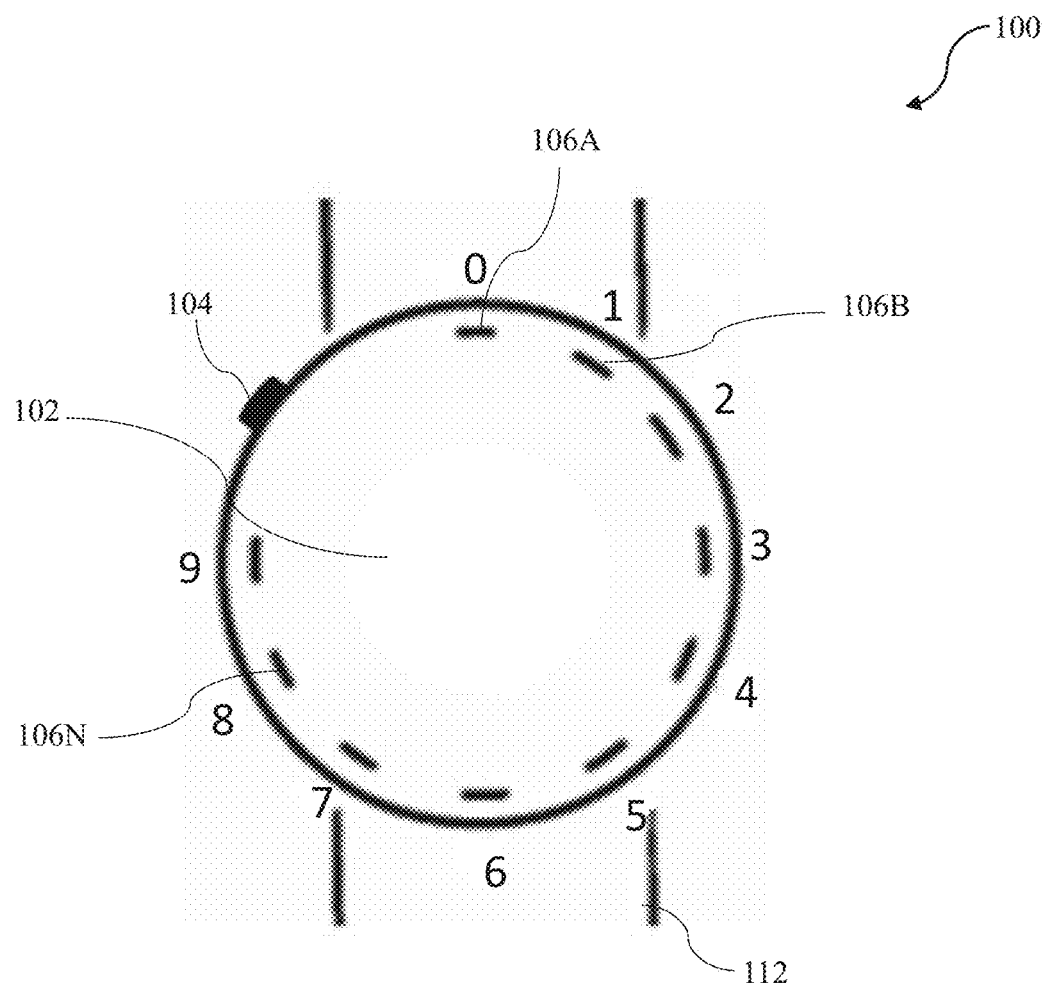
FIG. 2 illustrates an exemplary tactile smart watch for visually impaired comprising ten touch sensitive indicators disposed on a bezel of the tactile digital interface, in accordance with an embodiment of the present disclosure.

FIG. 2 illustrates an exemplary tactile smart watch 100 for visually impaired comprising ten touch sensitive indicators 106 disposed on a bezel of the tactile digital interface 102. Each of the one or more touch sensitive indicators 106 are associated with a unique digit from '0' to '9'. If numerical measure of the predefined health parameter is 703, the haptic feedback is received by the user by touching the one or more touch sensitive indicators. The haptic feedback includes three different predefined time of vibration at the touch sensitive indicators associated with digit '7' (hundred's), '0' (ten's) and '3' (one's) and finally understood as 'seven hundred and three'.

To read the exact same number on the tactile smart watch, the user touches and scans each of the one or more touch sensitive indicators 106 one by one. The user senses the longest vibration pulse (the first predefined time of vibration) generated when the touch sensitive indicators associated with digit 7 is touched. The user senses the shortest vibration pulse (the third predefined time of vibration) generated when the touch sensitive indicators associated with digit 3 is touched, and a pulse in mid-range (the second predefined time of vibration) was generated when the touch sensitive indicators associated with digit 0 is touched. Based on above touch observations, the user gets to know that the numerical measure of the health indicator is 703.

Figure 3:
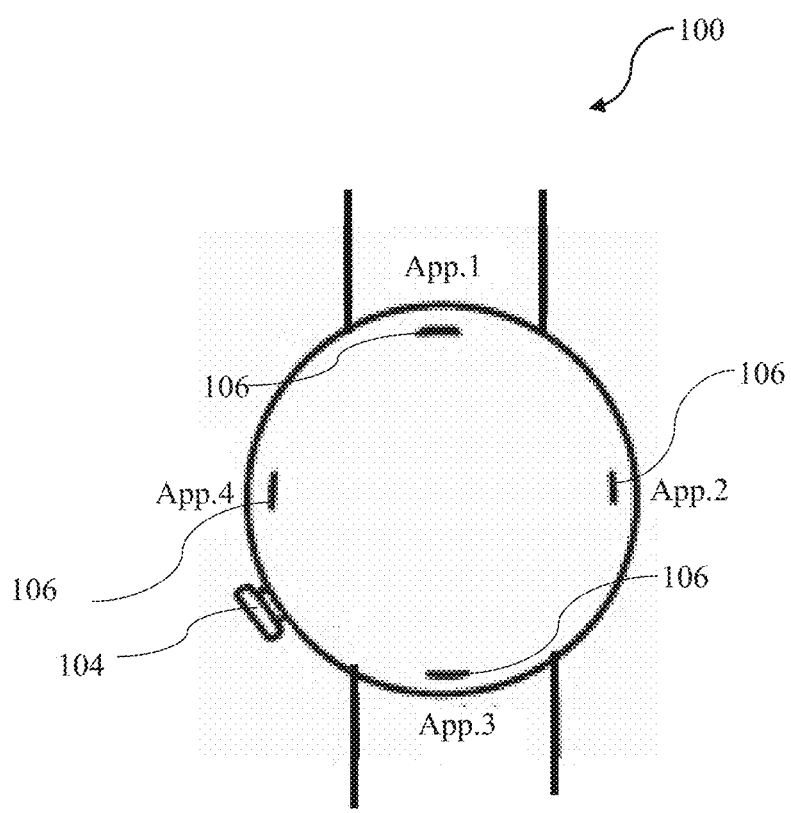
FIG. 3 illustrates an exemplary tactile smart watch for visually impaired depicting activation of applications via the tactile digital interface, in accordance with an embodiment of the present disclosure.

FIG. 3 illustrates an exemplary tactile smart watch for visually impaired depicting activation of applications via the tactile digital interface, in accordance with an embodiment of the present disclosure. The tactile smart watch may be installed with four software applications. Once the menu mode is activated, each of the touch sensitive indicators 106 located at the four ends of the tactile smart watch may get configured as an activation button for corresponding software application. For example, the user by engaging the touch sensitive indicator 106 at location of 12o'clock may become a dedicated button for activation of App. 1 configured for music playing.

Figure 4:
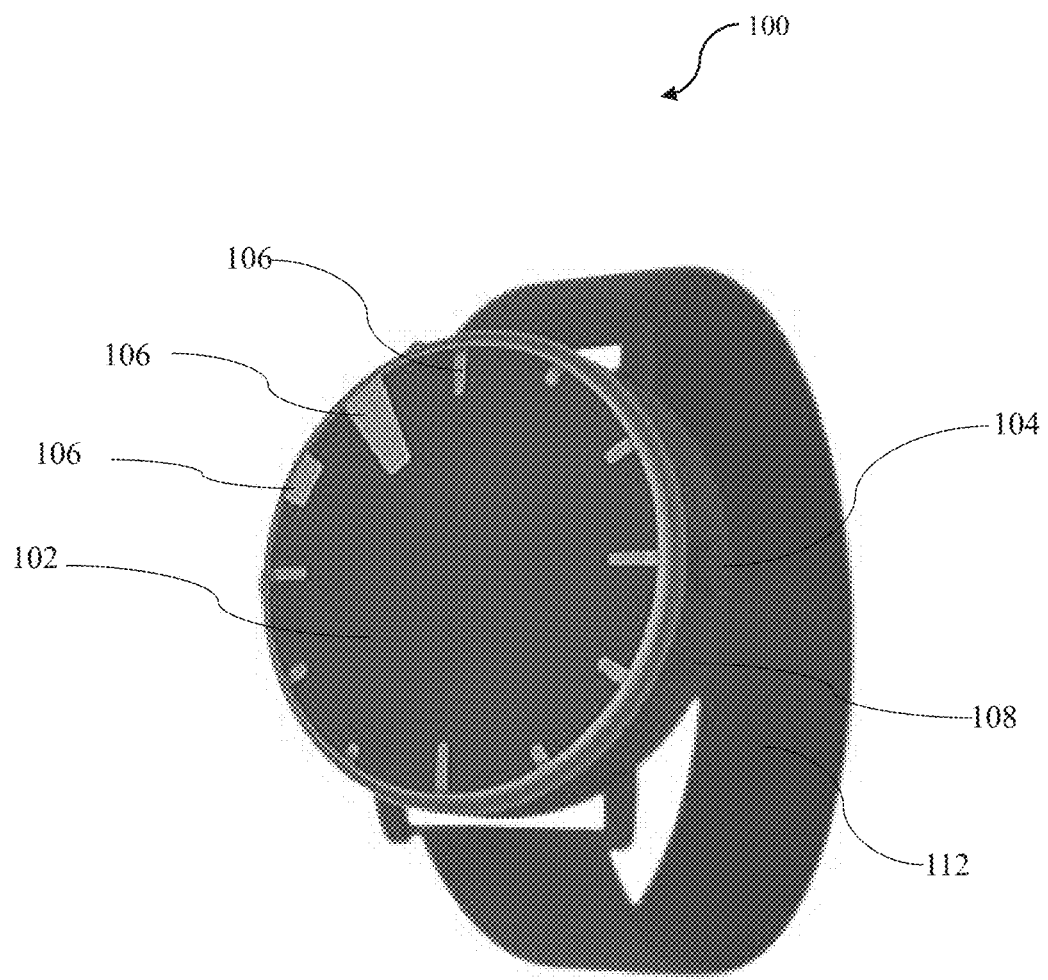
FIG. 4 illustrates a three-dimensional representation of an exemplary tactile smart watch for visually impaired comprising twelve touch sensitive indicators disposed on a bezel of the tactile digital interface, in accordance with an embodiment of the present disclosure.

FIG. 4 illustrates a three-dimensional representation of an exemplary tactile smart watch 100 for visually impaired comprising twelve touch sensitive indicators 106 disposed on a bezel of the tactile digital interface 102. The tactile smart watch 100 includes the watch case 108, the tactile push button 104, and the twelve touch sensitive indicators 106 on the tactile digital interface 102. The twelve touch sensitive indicators 106 may be associated with a unique digit from '12/0' to '11' to display time/health parameters.

Figure 5:
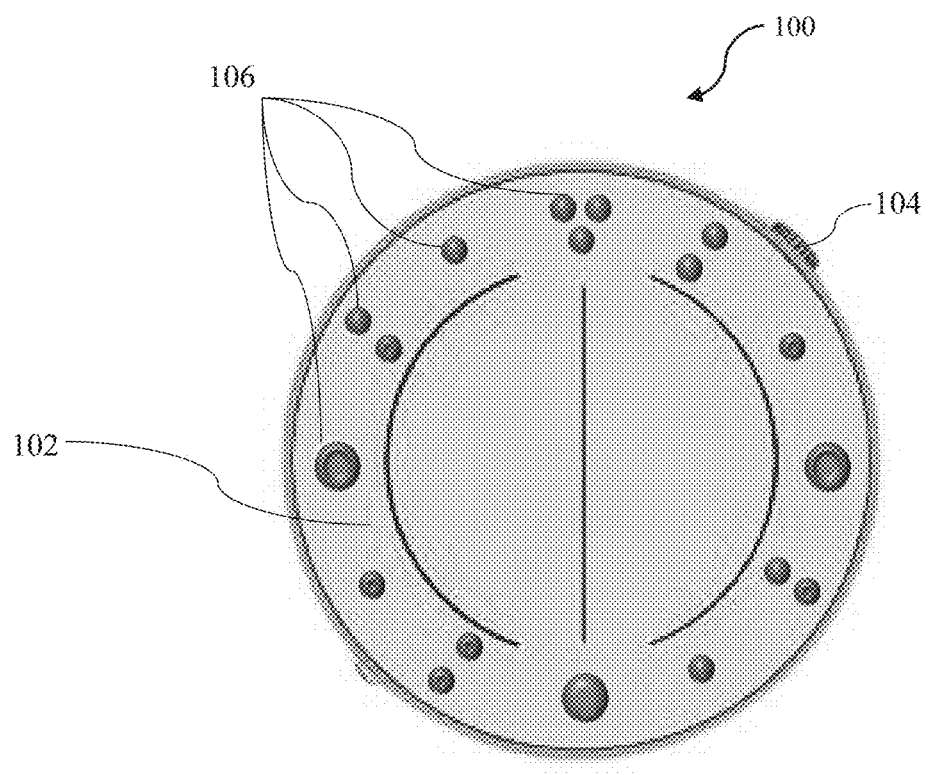
FIG. 5 illustrates an exemplary embodiment of arrangement of touch sensitive indicators on the tactile smart watch, in accordance with an embodiment of the present disclosure.

FIG. 5 illustrates an exemplary embodiment of the tactile smart watch 100. Each of the touch sensitive indicators 106 is further designed have a specific arrangement and shape to indicate a specific location on the tactile digital interface 102 for easy identification by touch by the user.

Figure 6:
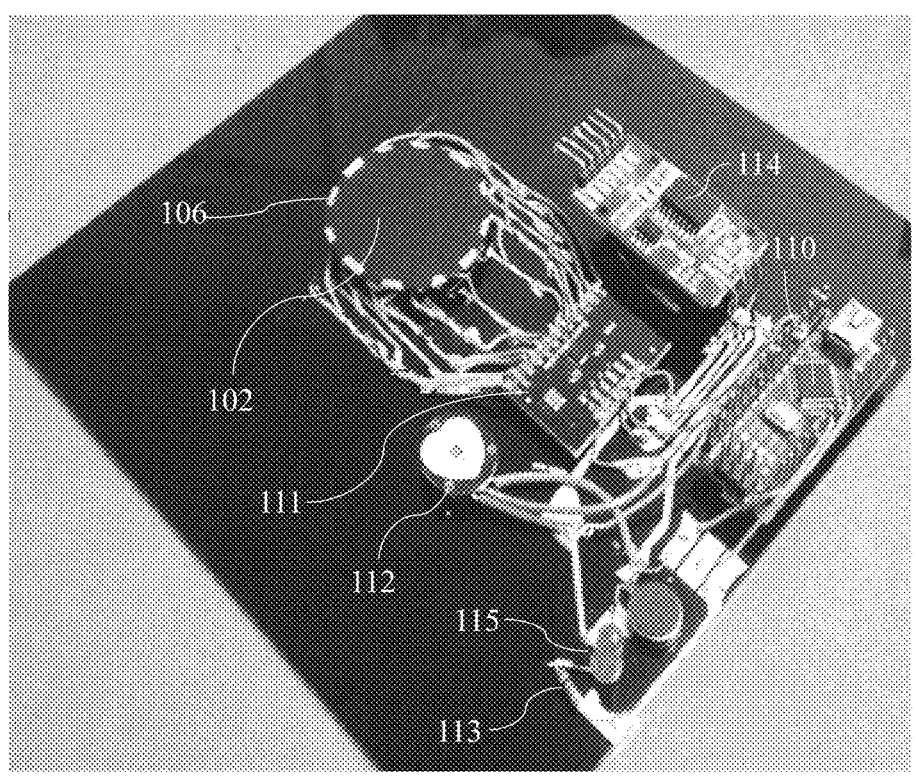
FIG. 6 illustrates a prototype circuit of a sensing module comprising one or more sensors and one or more microcontroller in exemplary tactile smart watch for health monitoring, in accordance with an embodiment of the present disclosure.

FIG. 6 illustrates a prototype circuit of a sensing module comprising one or more sensors 111-115 and one or more microcontroller 110 in exemplary tactile smart watch 100 for health monitoring, in accordance with an embodiment of the present disclosure. In an exemplary embodiment, the sensing module is disposed in the watch case 108 [as shown in FIG. 1]. The sensing module comprises one or more microprocessors configured with an interface to wirelessly connect to one or more computing devices for executing one or more applications on the one or more computing devices. The one or more microprocessors 110 is operatively coupled with one or more sensors to send one or more signals indicating the one or more haptic feedback. The one or more predefined parameters may be heart rate, oxygen saturation, blood pressure, environmental condition, and amount of movement of user, and a like. For sensing the above mentioned one or more predefined parameters, the one or more sensors 111-115 are communicatively coupled with the microprocessor 110, which may include a heart rate sensor, a SPo2 sensor, a blood pressure sensor, an environmental sensor, a motion sensor, and a like.

The one or more microprocessors 110 receives one or more signals from the one or more sensors 111-115 to determine the one or more application parameters numerically corresponding to the one or more touch inputs received. The one or more microprocessors 110 is configured to control the one or more haptic feedback in response to the one or more touch inputs received. The haptic feedback is generated by vibration of the one or more touch sensitive indicators 106 one by one in a predefined sequence for a predefined duration to communicate the one or more predefined parameters numerically.

In an exemplary prototype circuit of the tactile smart watch 100 including Arduino nano as the microcontroller 110, DS3231 as the timer IC 114, MPR121 as the capacitive touch sensor 111, pulse sensor 112, a haptic actuator (LRA) 113, and an LED (Blue) 115.

Figure 7:
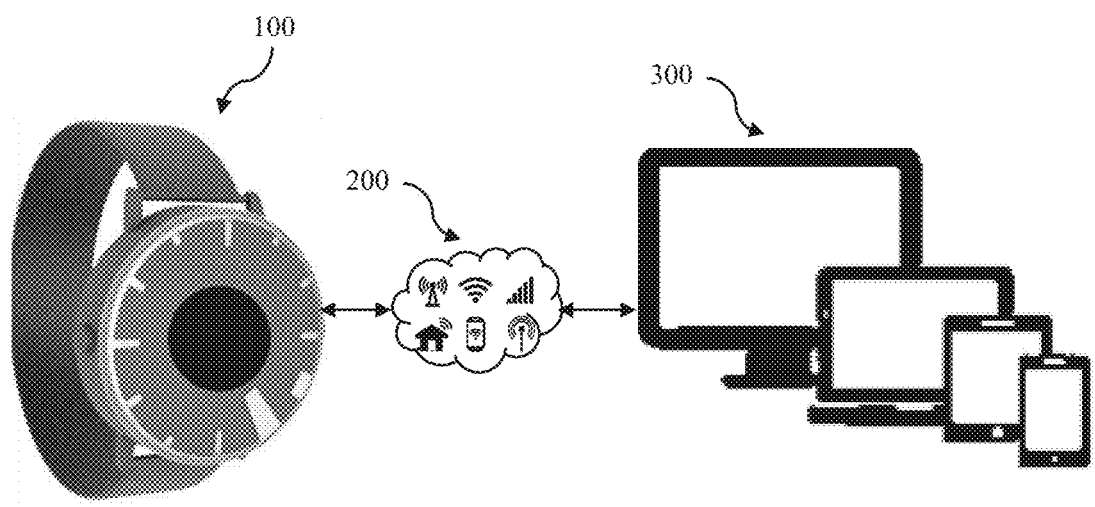
FIG. 7 illustrates an exemplary tactile smart watch in connection with one or more computing devices to perform one or more applications via a wireless means, in accordance with an embodiment of the present disclosure.

FIG. 7 illustrates an exemplary tactile smart watch 100 in connection with one or more computing devices 300 to perform one or more applications via a wireless means 200, in accordance with an embodiment of the present disclosure. The tactile smart watch 100 may be configured to communicate with a computing device 300 wirelessly via a wireless connection 200. The computing device may be desktop, laptop, notebook, smart phone, and the like. The wireless connection 200 may be established via Bluetooth, WI-FI, hotspot, and the like. In an exemplary embodiment, the sensing module configured is configured with an interface to wirelessly connect to one or more computing devices 300 for executing one or more applications on the one or more computing devices.

Figure 8:
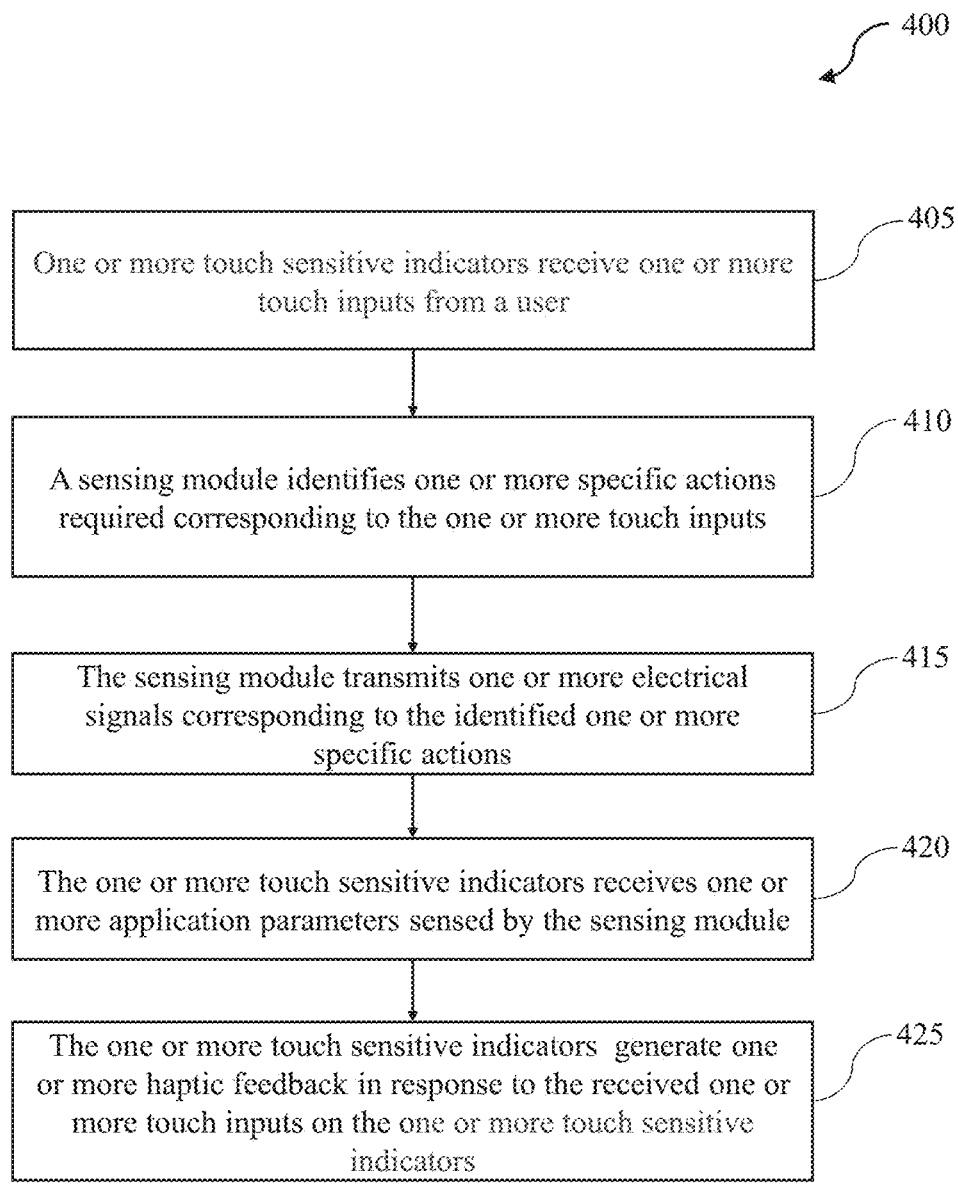
FIG. 8 is a flow diagram illustrating exemplary method of tactile smart watch for health monitoring, in accordance with an embodiment of the present disclosure.

FIG. 8 is a flow diagram illustrating exemplary method 400 of tactile smart watch 100 for health monitoring, in accordance with an embodiment of the present disclosure, in accordance with an embodiment of the present disclosure. The method 400 for the tactile smart watch for health monitoring includes following steps:

The first step 405 involves one or more touch sensitive indicators receiving one or more touch inputs from a user. The second step 410 involves the sensing module identifying one or more specific actions required corresponding to the one or more touch inputs. The third step 415 involves the sensing module transmitting one or more electrical signals corresponding to the identified one or more specific actions. The fourth step 420 involves one or more touch sensitive indicators receiving one or more application parameters sensed by the sensing module. The fifth step 425 involves the one or more touch sensitive indicators generating one or more haptic feedback in response to the received one or more touch inputs. The one or more application parameters are communicated, via haptic feedback, numerically to the user using the one or more touch sensitive indicators.

Therefore, various embodiments of the present disclosure provide a technical solution of smart compact health monitoring device conveniently usable by blind people. The present disclosure provides a smart watch and method thereof. The smart watch is wearable on wrist of user. The smart watch monitors the one or more health parameters and communicates information of the one or more health parameters to a blind user through the tactile interface using vibrations and touch sensing.

The tactile mode of communication makes way for a more private usage of the device as compared to audio mode. Also, the lack of audio processors, visual touch screen display, and a complex circuitry cuts down the overall cost of the smart watch to a fraction as compared to other existing smart watches for health monitoring. smart phone may pair up with the tactile smart watch to enhance utility of the tactile smart watch.

In a further exemplary embodiment, the GPS of a mobile phone may connect with the tactile smart watch to help the blind person to navigate. The tactile smart watch may be used and the indicators namely 0, 3, 6, and 9 may be used to output directions namely north, east, south, and west respectively. If a right turn is to be made, touching the 9th indicator will make the watch vibrate.

Also, a distinct vibration pulse may generate every time a change in direction is needed so the user gets alert and check for where to move. The tactile smart watch may also be made to operate a smartphone, such as—to receive or to decline a call using certain gestures like swipe on the tactile smart watch via establishing a Bluetooth connection between the tactile smart watch and the smart phone.

The tactile smart watch may also wirelessly connect with a wireless sound playing devices like wireless earbuds, headphone, speaker, etc. The tactile smart watch may include functionality to store and play songs and user may upload preferred songs into the device. The number of songs inside the device may be restricted by the device's holding capacity/memory. The songs may play randomly, and the user may get access to increase/decrease volume and play next, pause, and play previous. Swiping clockwise in aright side of the tactile smart watch may play the next selection. Swiping counter-clockwise in a left side of the tactile smart watch may play the previous song. Similarly, a full circular swipe (clockwise) will cause the song to pause/play.

Continuous long touch (say more than one second) on one touch sensitive indicator may gradually raise the volume as long as the same is touched. Similarly, a long touch on some other touch sensitive indicator may keep lowering the volume as long as the same is touched. Further, a speaker may also be embedded in the watch and audio-based output may also be facilitated with having an additional audio processor embedded in main circuit of the tactile watch.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A tactile smart watch for health monitoring and navigation of visually impaired, comprising:
   a watch case comprising a tactile digital interface;
   one or more tactile push buttons configured on an outer circumference of the watch case,
      wherein the one or more tactile push buttons are configured to activate one or more functions associated with the tactile smart watch;
   one or more touch sensitive indicators disposed on a bezel of the tactile digital interface,
      wherein each of the one or more touch sensitive indicators is configured to receive one or more touch inputs from a user, and identify one or more specific actions required corresponding to the one or more touch inputs,
      wherein the one or more specific actions comprises activating one or more applications in the tactile smart watch, activating one or more applications in a communicatively coupled smart device, and sensing one or more application parameters via a sensing module,
      wherein each of the one or more touch sensitive indicators are configured to generate one or more haptic feedback in response to the one or more touch inputs;
   the sensing module configured within the watch case,
      wherein the sensing module is configured to:
         receive one or more electrical signals corresponding to the identified one or more specific actions from the one or more touch sensitive indicators, and to sense one or more application parameters based on the received one or more electrical signals;
         generate a first tactile feedback to monitor health of the visually impaired using a first set of sensor, wherein the first set of sensors comprises a heart rate sensor, a SpO2 sensor, and a blood pressure sensor, wherein a first set of application parameters of the one or more application parameters corresponding to the first set of sensors comprises heart rate, oxygen saturation, and blood pressure; and
         generate a second tactile feedback to navigate the visually impaired based on navigational data from a GPS of a mobile device and a second set of sensors, wherein the second set of sensors comprises environmental sensor and a motion sensor; and wherein a second set of application parameters of the one or more application parameters corresponding to the second set of sensors comprises environmental condition and amount of movement of user,
      wherein the one or more application parameters are communicated, via haptic feedback, numerically to the user, in a predefined sequence by a predefined duration of vibration, using the one or more touch sensitive indicators.

2. The tactile smart watch as claimed in claim 1, wherein the one or more haptic feedback comprises vibration of the one or more touch sensitive indicators in a predefined sequence for a predefined duration.

3. The tactile smart watch for health monitoring of visually impaired as claimed in claim 1, wherein the predefined duration of the vibration represents place value of the predefined numerical digit.

4. A method for the tactile smart watch for health monitoring and navigation of visually impaired as claimed in claim 1, the method for the tactile smart watch comprising:
   receiving, by one or more touch sensitive indicators, one or more touch inputs from a user;
   identifying, by the sensing module, one or more specific actions required to the one or more touch inputs, wherein the one or more specific actions comprises activating one or more applications in the tactile smart watch, activating one or more applications in a communicatively coupled smart device, and sensing one or more application parameters;
   receiving, by the one or more touch sensitive indicators, one or more application parameters; and
   generating, by the one or more touch sensitive indicators, one or more haptic feedback in response to the received one or more touch inputs, comprising:
      generating, a first tactile feedback to monitor health of the visually impaired using a first set of sensor, wherein the first set of sensors comprises a heart rate sensor, a SpO2 sensor, and a blood pressure sensor, wherein a first set of application parameters of the one or more application parameters corresponding to the first set of sensors comprises heart rate, oxygen saturation, and blood pressure; and generating, a second tactile feedback to navigate the visually impaired based on navigational data from a GPS of a mobile device and a second set of sensors, wherein the second set of sensors comprises environmental sensor and a motion sensor; and wherein a second set of application parameters of the one or more application parameters corresponding to the second set of sensors comprises environmental condition and amount of movement of user, wherein the one or more applications parameters are communicated, via haptic feedback, numerically to the user, in a predefined sequence by a predefined duration of vibration, using the one or more touch sensitive indicators.

\* \* \* \* \*